United States Patent
Li et al.

[19]

[11] Patent Number: 5,860,060
[45] Date of Patent: Jan. 12, 1999

[54] METHOD FOR LEFT/RIGHT CHANNEL SELF-ALIGNMENT

[75] Inventors: Stephen (Hsiao Yi) Li, Garland; James (Sang-Won) Song; Paul M. Look, both of Richardson, all of Tex.

[73] Assignee: Texas Instruments Incorporated, Dallas, Tex.

[21] Appl. No.: 850,404

[22] Filed: May 2, 1997

[51] Int. Cl.[6] .................................................. G11B 5/00
[52] U.S. Cl. .......................... 704/500; 364/900; 364/200; 704/503; 704/212; 358/409
[58] Field of Search .................. 364/900, 200; 704/500, 212, 503; 358/409

[56] References Cited

U.S. PATENT DOCUMENTS

| | | | |
|---|---|---|---|
| 4,443,865 | 4/1984 | Schultz et al. ........................... | 364/900 |
| 4,511,961 | 4/1985 | Penton .................................... | 364/200 |
| 4,606,040 | 8/1986 | David et al. ............................. | 375/1 |
| 4,630,230 | 12/1986 | Sundet .................................... | 364/900 |
| 4,670,790 | 6/1987 | Sawada et al. .......................... | 358/188 |
| 4,685,004 | 8/1987 | Takaahashi et al. ..................... | 360/32 |
| 5,043,877 | 8/1991 | Berger et al. ............................ | 364/200 |
| 5,125,102 | 6/1992 | Chidress et al. .......................... | 455/9 |
| 5,146,371 | 9/1992 | Hamada et al. .......................... | 360/32 |
| 5,155,829 | 10/1992 | Koo ........................................ | 395/425 |
| 5,163,139 | 11/1992 | Haigh et al. ............................. | 395/375 |
| 5,424,879 | 6/1995 | Yamada et al. .......................... | 360/22 |
| 5,636,264 | 6/1997 | Sulavuori et al. ........................ | 379/56 |

OTHER PUBLICATIONS

NPEG-2, *Information Technology—Generic Coding of Moving Pictures and Audio: ISO/IEC 13818-3*, 2nd Edition, 20 Feb. 1997 (ISO/IEC JTC1/SC29/WG11 N1519), Int'l Org. for Standardisation Coding of Moving Pictures and Audio.

*Digital Audio Compression, Standard (AC-3)*, 20 Dec., 1995, Advanced Television Systems Committee, ATSC Standard.

TI-17424A (S.N. 08/475,251), allowed, *Integrated Audio Decoder Systems and Method of Operation*.

TI-24442P (S.N. 60/030,106), filed Provisionally Nov. 1, 1996. *Integrated Audio/Video Decoder Circuitry*.

*Primary Examiner*—David R. Hudspeth
*Assistant Examiner*—Daniel Abebe
*Attorney, Agent, or Firm*—Gerald E. Laws; Robert D. Marshall, Jr.; Richard L. Donaldson

[57] ABSTRACT

A data processing device uses a portion of random access memory 121 as an output buffer 124 for holding a portion of a stream of PCM data which is to be output to a digital to analog converter 530. D/A 530 forms a left analog channel and a right analog channel for speaker subsystems 814 and 815. The PCM data stream is stored in the output buffer so that PCM data samples which pertain to the left channel are stored at even address and PCM data samples which pertain to the right channel are stored at odd address. Control circuitry 145 monitors direct memory access (DMA) transfers which transfer PCM data samples to PCM serializer 142. By comparing the address of each DMA transfer to a left/right channel signal from the D/A, the control circuitry can verify that channel synchronization is correct. If a synchronization error is detected, an channel synchronization error correction procedure is invoked.

19 Claims, 7 Drawing Sheets

METHOD FOR LEFT/RIGHT CHANNEL SELF-ALIGNMENT

FIELD OF THE INVENTION

This invention relates in general to the field of electronic systems and more particularly to an improved modular audio data processing architecture and method of operation.

BACKGROUND OF THE INVENTION

Audio and video data compression for digital transmission of information will soon be used in large scale transmission systems for television and radio broadcasts as well as for encoding and playback of audio and video from such media as digital compact cassette and minidisc.

The Motion Pictures Expert Group (MPEG) has promulgated the MPEG audio and video standards for compression and decompression algorithms to be used in the digital transmission and receipt of audio and video broadcasts in ISO-11172 (hereinafter the "MPEG Standard"). The MPEG Standard provides for the efficient compression of data according to an established psychoacoustic model to enable real time transmission, decompression and broadcast of CD-quality sound and video images. The MPEG standard has gained wide acceptance in satellite broadcasting, CD-ROM publishing, and DAB. The MPEG Standard is useful in a variety of products including digital compact cassette decoders and encoders, and minidisc decoders and encoders, for example. In addition, other audio standards, such as the Dolby AC-3 standard, involve the encoding and decoding of audio and video data transmitted in digital format.

The AC-3 standard has been adopted for use on laser disc, digital video disk (DVD), the US ATV system, and some emerging digital cable systems. The two standards potentially have a large overlap of application areas.

Both of the standards are capable of carrying up to five full channels plus one bass channel, referred to as "5.1 channels," of audio data and incorporate a number of variants including sampling frequencies, bit rates, speaker configurations, and a variety of control features. However, the standards differ in their bit allocation algorithms, transform length, control feature sets, and syntax formats.

Both of the compression standards are based on psychoacoustics of the human perception system. The input digital audio signals are split into frequency subbands using an analysis filter bank. The subband filter outputs are then downsampled and quantized using dynamic bit allocation in such a way that the quantization noise is masked by the sound and remains imperceptible. These quantized and coded samples are then packed into audio frames that conform to the respective standard's formatting requirements. For a 5.1 channel system, high quality audio can be obtained for compression ratio in the range of 10:1.

The transmission of compressed digital data uses a data stream that may be received and processed at rates up to 15 megabits per second or higher. Prior systems that have been used to implement the MPEG decompression operation and other digital compression and decompression operations have required expensive digital signal processors and extensive support memory. Other architectures have involved large amounts of dedicated circuitry that are not easily adapted to new digital data compression or decompression applications.

An object of the present invention is provide an improved apparatus and methods of processing MPEG, AC-3 or other streams of data.

Other objects and advantages will be apparent to those of ordinary skill in the art having reference to the following figures and specification.

SUMMARY OF THE INVENTION

In general, and in a form of the present invention a data processing device for processing a stream of data is provided that automatically determines channel synchronization. Processing circuitry forms a stream of PCM samples and places samples affiliated with a left channel in a memory circuit at a first range of addresses. Likewise, samples affiliated with a right channel are placed in a second range of addresses. Transfer circuitry transfers the stream of PCM samples in a sequential, channel interleaved manner to a port for transfer to an external device. Channel circuitry is connected to an address bus and is operable to infer channel affiliation of the stream of PCM samples from the addresses at which they were placed in the memory circuit. A PCM sample is deleted or resent in order to establish channel synchronization.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which.

Corresponding numerals and symbols in the different figures and tables refer to corresponding parts unless otherwise indicated.

DETAILED DESCRIPTION OF THE INVENTION

Aspects of the present invention include methods and apparatus for processing and decompressing an audio data stream. In the following description, specific information is set forth to provide a thorough understanding of the present invention. Well known circuits and devices are included in block diagram form in order not to complicate the description unnecessarily. Moreover, it will be apparent to one skilled in the art that specific details of these blocks are not required in order to practice the present invention.

The present invention comprises a system that is operable to efficiently decode a stream of data that has been encoded and compressed using any of a number of encoding standards, such as those defined by the Moving Pictures Expert Group (MPEG-1 or MPEG-2), or the Digital Audio Compression Standard (AC-3), for example. In order to accomplish the real time processing of the data stream, the system of the present invention must be able to receive a bit stream that can be transmitted at variable bit rates up to 15 megabits per second and to identify and retrieve a particular audio data set that is time multiplexed with other data within the bit stream. The system must then decode the retrieved data and present conventional pulse code modulated (PCM) data to a digital to analog converter which will, in turn, produce conventional analog audio signals with fidelity comparable to other digital audio technologies. The system of the present invention must also monitor synchronization within the bit stream and synchronization between the decoded audio data and other data streams, for example, digitally encoded video images associated with the audio which must be presented simultaneously with decoded audio data. In addition, MPEG or AC-3 data streams can also contain ancillary data which may be used as system control information or to transmit associated data such as song titles or the like. The system of the present invention must recognize ancillary data and alert other systems to its presence.

Figure 1:
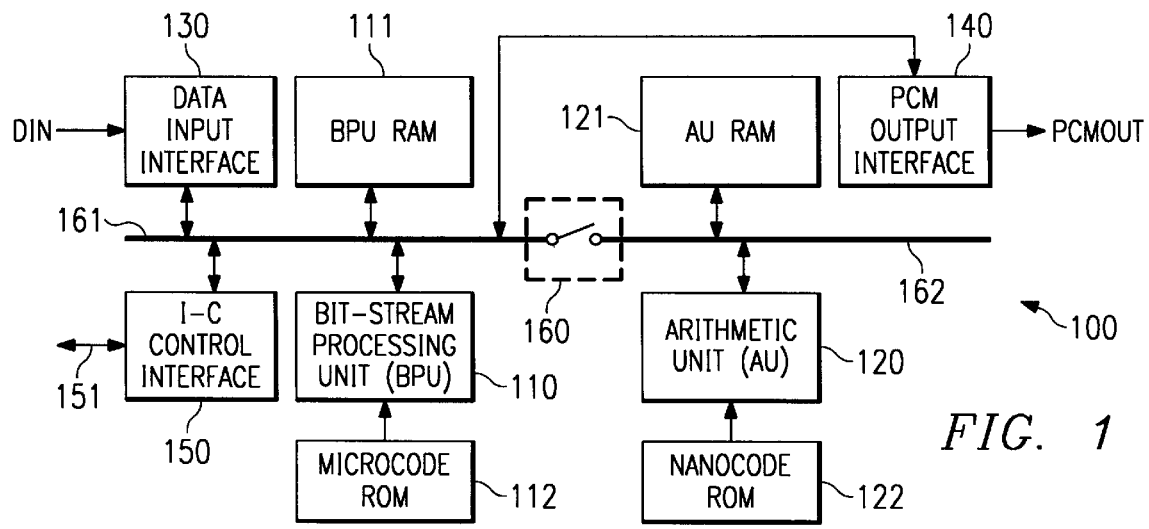
FIG. 1 is a block diagram of a data processing device constructed in accordance with aspects of the present invention.

In order to appreciate the significance of aspects of the present invention, the architecture and general operation of a data processing device which meets the requirements of the preceding paragraph will now be described. Referring to FIG. 1, which is a block diagram of a data processing device 100 constructed in accordance with aspects of the present invention, the architecture of data processing device 100 is illustrated. The architectural hardware and software implementation reflect the two very different kinds of tasks to be performed by device 100: decoding and synthesis. In order to decode a steam of data, device 100 must unpack variable length encoded pieces of information from the stream of data. Additional decoding produces set of frequency coefficients. The second task is a synthesis filter bank that converts the frequency domain coefficients to PCM data. In addition, device 100 also needs to support dynamic range compression, downmixing, error detection and concealment, time synchronization, and other system resource allocation and management functions.

The design of device 100 includes two autonomous processing units working together through shared memory supported by multiple I/O modules. The operation of each unit is data-driven. The synchronization is carried out by the Bit-stream Processing Unit (BPU) which acts as the master processor. Bit-stream Processing Unit (BPU) 110 has a RAM 111 for holding data and a ROM 112 for holding instructions which are processed by BPU 110. Likewise, Arithmetic Unit (AU) 120 has a RAM 121 for holding data and a ROM 122 for holding instructions which are processed by AU 120. Data input interface 130 receives a stream of data on input lines DIN which is to be processed by device 100. PCM output interface 140 outputs a stream of PCM data on output lines PCMOUT which has been produced by device 100. Inter-Integrated Circuit ($I^2C$) Interface 150 provides a mechanism for passing control directives or data parameters on interface lines 151 between device 100 and other control or processing units, which are not shown, using a well known protocol. Bus switch 160 selectively connects address/data bus 161 to address/data bus 162 to allow BPU 110 to pass data to AU 120.

Figure 2:
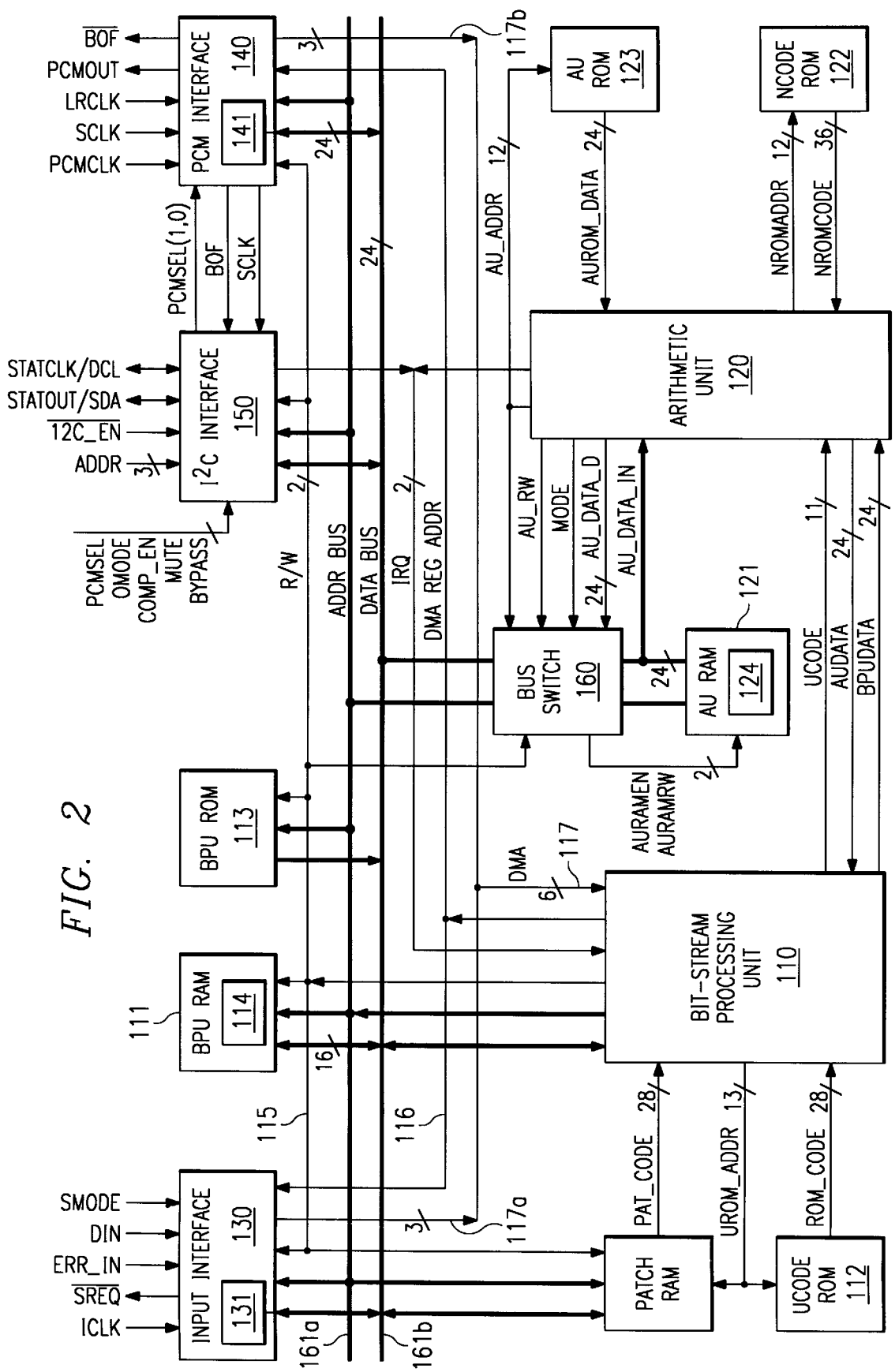
FIG. 2 is a more detailed block diagram of the data processing device of FIG. 1, illustrating interconnections of a Bit-stream Processing Unit and an Arithmetic Unit.

FIG. 2 is a more detailed block diagram of the data processing device of FIG. 1, illustrating interconnections of Bit-stream Processing Unit 110 and Arithmetic Unit 120. A BPU ROM 113 for holding data and coefficients and an AU ROM 123 for holding data and coefficients is also shown.

A typical operation cycle is as follows: Coded data arrives at the Data Input Interface 130 asynchronous to device 100's system clock, which operates at 27 MHz. Data Input Interface 130 synchronizes the incoming data to the 27 MHz device clock and transfers the data to a buffer area 114 in BPU memory 111 through a direct memory access (DMA) operation. BPU 110 reads the compressed data from buffer 114, performs various decoding operations, and writes the unpacked frequency domain coefficients to AU RAM 121, a shared memory between BPU and AU. Arithmetic Unit 120 is then activated and performs subband synthesis filtering, which produces a stream of reconstructed PCM samples which are stored in output buffer area 124 of AU RAM 121. PCM Output Interface 140 receives PCM samples from output buffer 124 through a DMA transfer and then formats and outputs them to an external D/A converter. Additional functions performed by the BPU include control and status I/O, as well as overall system resource management.

Figure 3:
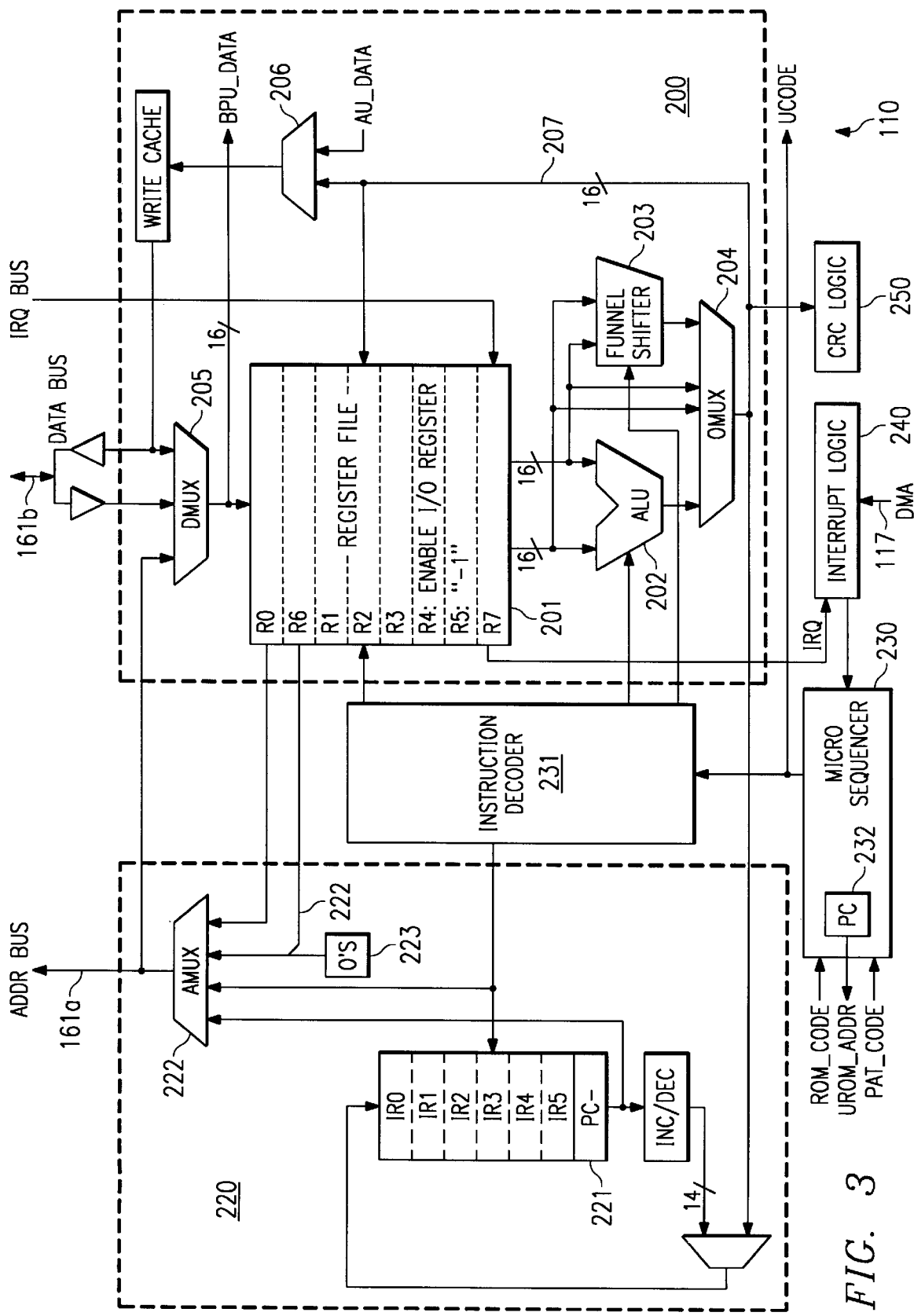
FIG. 3 is a block diagram of the Bit-stream Processing Unit of FIG. 2.

FIG. 3 is a block diagram of the Bit-stream Processing Unit of FIG. 2. BPU 110 is a programmable processor with hardware acceleration and instructions customized for audio decoding. It is a 16-bit reduced instruction set computer (RISC) processor with a register-to-register operational unit 200 and an address generation unit 220 operating in parallel. Operational unit 200 includes a register file 201 an arithmetic/logic unit 202 which operates in parallel with a funnel shifter 203 on any two registers from register file 201, and an output multiplexer 204 which provides the results of each cycle to input mux 205 which is in turn connected to register file 201 so that a result can be stored into one of the registers.

BPU 110 is capable of performing an ALU operation, a memory I/O, and a memory address update operation in one system clock cycle. Three addressing modes: direct, indirect, and registered are supported. Selective acceleration is provided for field extraction and buffer management to reduce control software overhead. Table 1 is a list of the instruction set.

TABLE 1

BPU Instruction Set

| Instruction Mnemonics | Functional Description |
| --- | --- |
| And | Logical and |
| Or | Logical or |
| cSat | Conditional saturation |
| Ash | Arithmetic shift |
| LSh | Logical shift |

TABLE 1-continued

BPU Instruction Set

| Instruction Mnemonics | Functional Description |
| --- | --- |
| RoRC | Rotate right with carry |
| GBF | Get bit-field |
| Add | Add |
| AddC | Add with carry |
| cAdd | Conditional add |
| Xor | Logical exclusive or |
| Sub | Subtract |
| SubB | Subtract with borrow |
| SubR | Subtract reversed |
| Neg | 2's complement |
| cNeg | Conditional 2's complement |
| Bcc | Conditional branch |
| DBcc | Decrement & conditional branch |
| IOST | IO reg to memory move |
| IOLD | Memory to IO reg move |
| auOp | AU operation - loosely coupled |
| auEx | AU execution - tightly coupled |
| Sleep | Power down unit |

BPU 110 has two pipeline stages: Instruction Fetch/Predecode which is performed in Micro Sequencer 230, and Decode/Execution which is performed in conjunction with instruction decoder 231. The decoding is split and merged with the Instruction Fetch and Execution respectively. This arrangement reduces one pipeline stage and thus branching overhead. Also, the shallow pipe operation enables the processor to have a very small register file (four general purpose registers, a dedicated bit-stream address pointer, and a control/status register) since memory can be accessed with only a single cycle delay.

Figure 4:
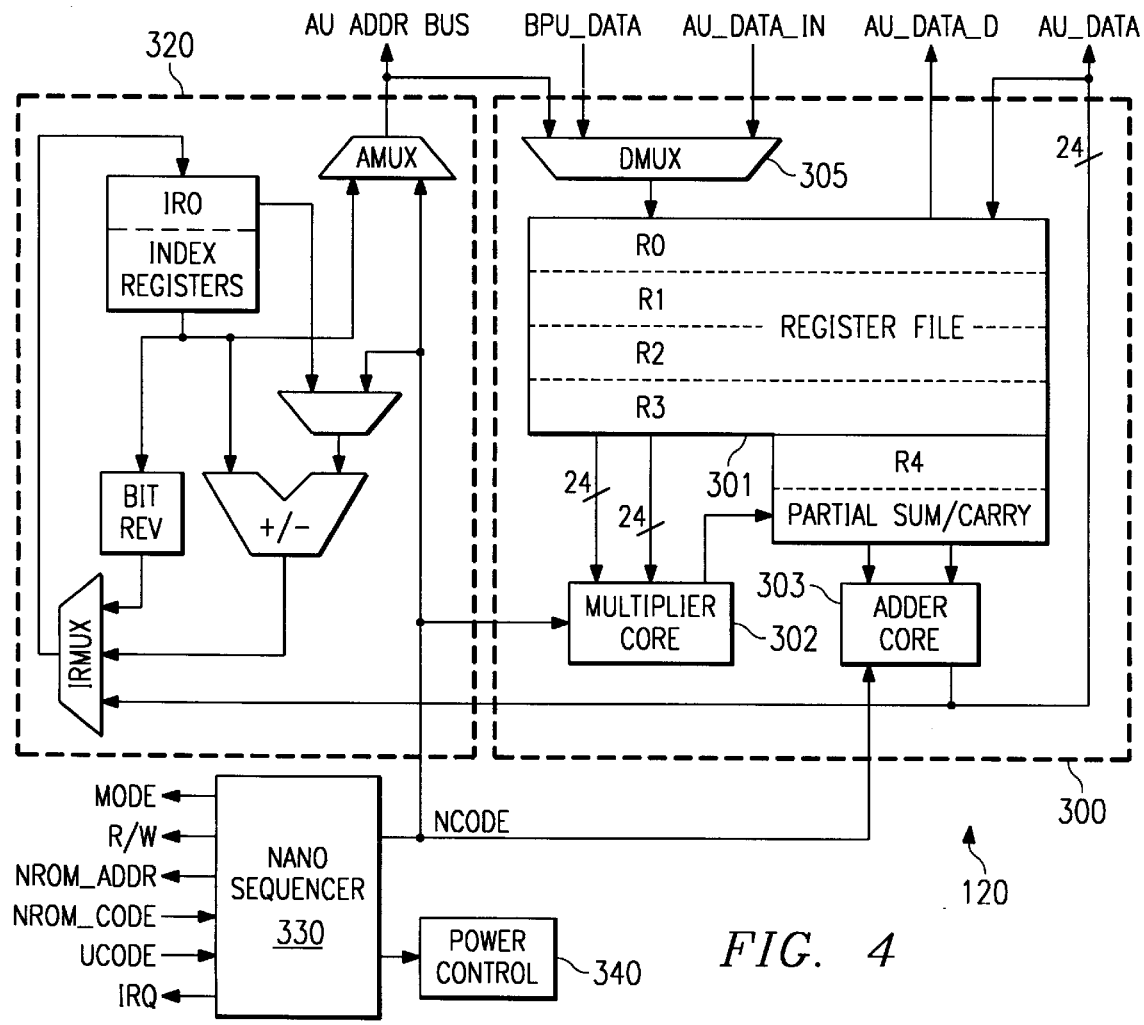
FIG. 4 is a block diagram of the Arithmetic Unit of FIG. 2.

FIG. 4 is a block diagram of the Arithmetic Unit of FIG. 2. Arithmetic unit 120 is a programmable fixed point math processor that performs the subband synthesis filtering. A complete description of subband synthesis filtering is provided in U.S. Pat. No. 5,644,310,(U.S. patent application Ser. No. 08/475,251 entitled *Integrated Audio Decoder System And Method Of Operation* or U.S. patent application Ser. No. 08/054,768 entitled *Hardware Filter Circuit And Address Circuitry For MPEG Encoded Data,* both assigned to the assignee of the present application), which is included herein by reference; in particular, FIGS. 7–9 and 11–31 and related descriptions.

The AU 120 module receives frequency domain coefficients from the BPU by means of shared AU memory 121. After the BPU has written a block of coefficients into AU memory 121, the BPU activates the AU through a coprocessor instruction, auOp. BPU 110 is then free to continue decoding the audio input data. Synchronization of the two processors is achieved through interrupts, using interrupt circuitry 240 (shown in FIG. 3).

AU 120 is a 24-bit RISC processor with a register-to-register operational unit 300 and an address generation unit 320 operating in parallel. Operational unit 300 includes a register file 301, a multiplier unit 302 which operates in conjunction with an adder 303 on any two registers from register file 301. The output of adder 303 is provided to input mux 305 which is in turn connected to register file 301 so that a result can be stored into one of the registers.

A bit-width of 24 bits in the data path in the arithmetic unit was chosen so that the resulting PCM audio will be of superior quality after processing. The width was determined by comparing the results of fixed point simulations to the results of a similar simulation using double-precision floating point arithmetic. In addition, double-precision multiplies are performed selectively in critical areas within the subband synthesis filtering process.

Figure 5:
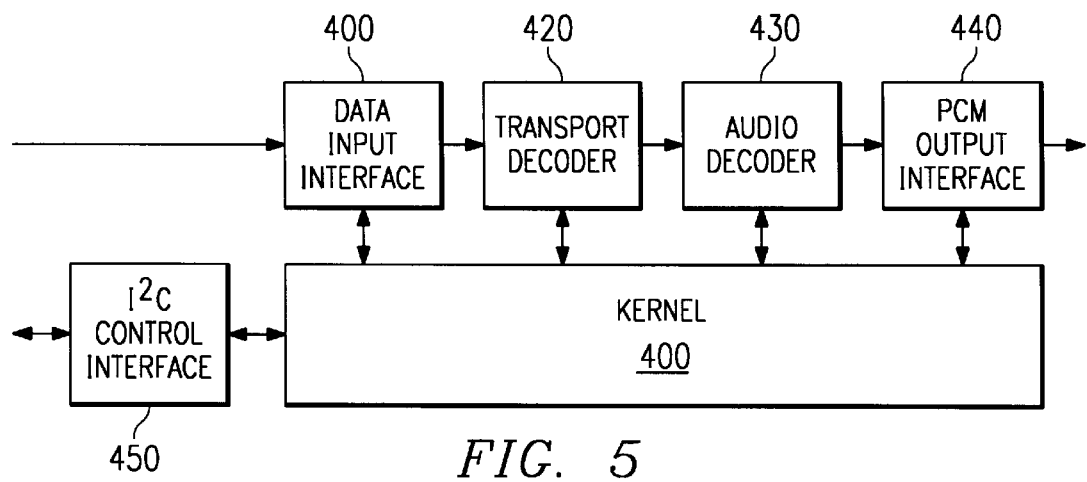
FIG. 5 is a block diagram illustrating the architecture of the software which operates on the device of FIG. 1.

FIG. 5 is a block diagram illustrating the architecture of the software which operates on data processing device 100. Each hardware component in device 100 has an associated software component, including the compressed bit-stream input, audio sample output, host command interface, and the audio algorithms themselves. These components are overseen by a kernel that provides real-time operation using interrupts and software multi-tasking.

The software architecture block diagram is illustrated in FIG. 5. Each of the blocks corresponds to one system software task. These tasks run concurrently and communicate via global memory 111. They are scheduled according to priority, data availability, and synchronized to hardware using interrupts. The concurrent data-driven model reduces RAM storage by allowing the size of a unit of data processed to be chosen independently for each task.

The software operates as follows. Data Input Interface 410 buffers input data and regulates flow between the external source and the internal decoding tasks. Transport Decoder 420 strips out packet information from the input data and emits a raw AC-3 or MPEG audio bit-stream, which is processed by Audio Decoder 430. PCM Output Interface 440 synchronizes the audio data output to a system-wide absolute time reference and, when necessary, attempts to conceal bit-stream errors. I$^2$C Control Interface 450 accepts configuration commands from an external host and reports device status. Finally, Kernel 400 responds to hardware interrupts and schedules task execution.

Figure 6:
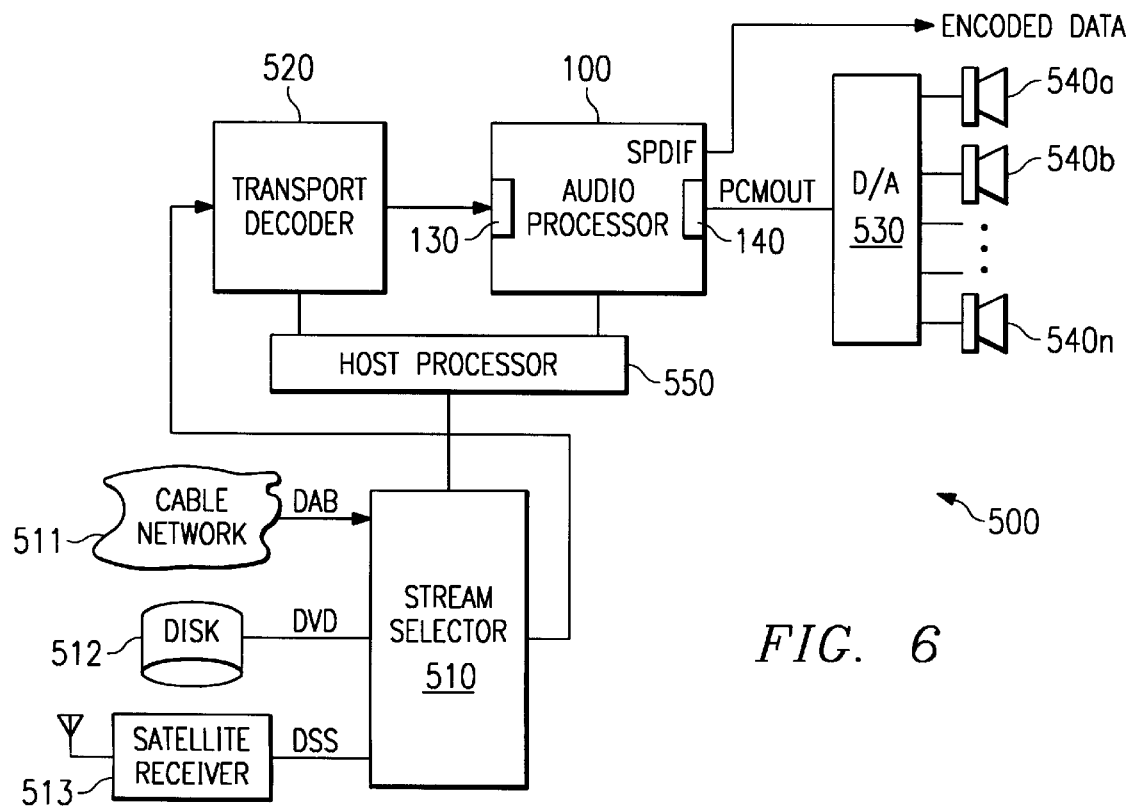
FIG. 6 is a block diagram illustrating an audio reproduction system which includes the data processing device of FIG. 1.

FIG. 6 is a block diagram illustrating an audio reproduction system 500 which includes the data processing device of FIG. 1. Stream selector 510 selects a transport data stream from one or more sources, such as a cable network system 511, digital video disk 512, or satellite receiver 513, for example. A selected stream of data is then sent to transport decoder 520 which separates a stream of audio data from the transport data stream according to the transport protocol, such as MPEG or AC-3, for that stream. Transport decoder typically recognizes a number of transport data stream formats, such as direct satellite system (DSS), digital video disk (DVD), or digital audio broadcasting (DAB), for example. The selected audio data stream is then sent to data processing device 100 via input interface 130. Device 100 unpacks, decodes, and filters the audio data stream, as discussed previously, to form a stream of PCM data which is passed via PCM output interface 140 to D/A device 530. D/A device 530 then forms at least one channel of analog data which is sent to a speaker subsystem 540$a$. Typically, A/D 530 forms two channels of analog data for stereo output into two speaker subsystems 540$a$ and 540$b$. Processing device 100 is programmed to downmix an MPEG-2 or AC-3 system with more than two channels, such as 5.1 channels, to form only two channels of PCM data for output to stereo speaker subsystems 540$a$ and 540$b$.

Alternatively, processing device 100 can be programmed to provide up to six channels of PCM data for a 5.1 channel sound reproduction system if the selected audio data stream conforms to MPEG-2 or AC-3. In such a 5.1 channel system, D/A 530 would form six analog channels for six speaker subsystems 540$a$–$n$. Each speaker subsystem 540 contains at least one speaker and may contain an amplification circuit (not shown) and an equalization circuit (not shown).

The SPDIF (Sony/Philips Digital Interface Format) output of device 100 conforms to a subset of the Audio Engineering Society's AES3 standard for serial transmission of digital audio data. The SPDIF format is a subset of the minimum implementation of AES3. This stream of data can be provided to another system (not shown) for further processing or re-transmission.

Figure 7:
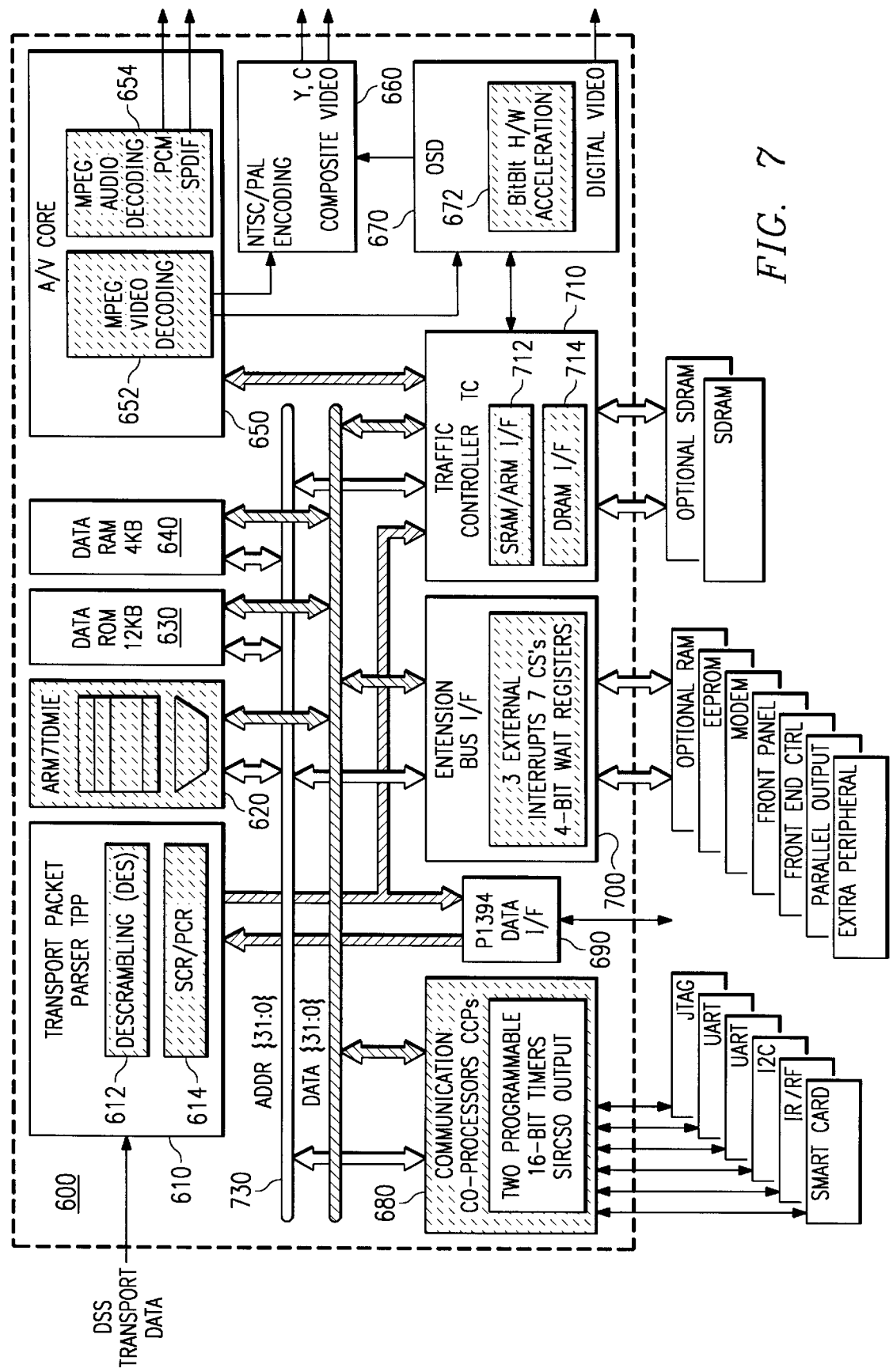
FIG. 7 is a block diagram of an integrated circuit which includes the data processing device of FIG. 1 in combination with other data processing devices, the integrated circuit being connected to various external devices.

Referring now to FIG. 7 there may be seen a functional block diagram of a circuit 300 that forms a portion of an audio-visual system which includes aspects of the present invention. More particularly, there may be seen the overall functional architecture of a circuit including on-chip interconnections that is preferably implemented on a single chip as depicted by the dashed line portion of FIG. 7. As depicted inside the dashed line portion of FIG. 7, this circuit consists of a transport packet parser (TPP) block 610 that includes a bit-stream decoder or descrambler 612 and clock recovery circuitry 614, an ARM CPU block 620, a data ROM block 630, a data RAM block 640, an audio/video (A/V) core block 650 that includes an MPEG-2 audio decoder 654 and an MPEG-2 video decoder 652, an NTSC/PAL video encoder block 660, an on screen display (OSD) controller block 670 to mix graphics and video that includes a bit-blt hardware (H/W) accelerator 672, a communication coprocessor (CCP) block 680 that includes connections for two UART serial data interfaces, infra red (IR) and radio frequency (RF) inputs, SIRCS input and output, an $I^2C$ port and a Smart Card interface, a P1394 interface (I/F) block 690 for connection to an external 1394 device, an extension bus interface (I/F) block 700 to connect peripherals such as additional RS232 ports, display and control panels, external ROM, DRAM, or EEPROM memory, a modem and an extra peripheral, and a traffic controller (TC) block 710 that includes an SRAM/ARM interface (I/F) 712 and a DRAM I/F 714. There may also be seen an internal 32 bit address bus 320 that interconnects the blocks and an internal 32 bit data bus 730 that interconnects the blocks. External program and data memory expansion allows the circuit to support a wide range of audio/video systems, especially, as for example, but not limited to set-top boxes, from low end to high end.

The consolidation of all these functions onto a single chip with a large number of communications ports allows for removal of excess circuitry and/or logic needed for control and/or communications when these functions are distributed among several chips and allows for simplification of the circuitry remaining after consolidation onto a single chip. Thus, audio decoder 354 is the same as data processing device 100 with suitable modifications of interfaces 130, 140, 150 and 170. This results in a simpler and cost-reduced single chip implementation of the functionality currently available only by combining many different chips and/or by using special chipsets.

A novel aspect of data processing device 100 will now be discussed in detail, with reference to FIG. 8, which is a block diagram illustrating PCM interface 140 of device 100 connected to an external digital-to-analog (D/A) circuit 530. As described earlier, PCM samples are transferred from output buffer 124 to PCM output interface 140 via DMA transfers. In device 100, a DMA transfer is performed when BPU 110 executes an IOLD or an IOST instruction in response to an I/O request from input interface 130 or PCM interface 140.

Referring again to FIG. 2, there are two sets of I/O transfer request signals available to be used to perform I/O transfers. Signal set 117a comes from block 130 and signal set 117b comes from block 140 to BPU 110. Each set is comprised of three signals: I/O Request 860 or 870, I/O Direction, and Interrupt. In addition, a one-bit I/O Register address signal 116 comes from BPU 110 to the two I/O blocks containing I/O Registers 131 and 141.

Each I/O block 130, 140 needs to decode the one-bit I/O address signal 116 and a 2-bit rw signal 115. The rw signals are defined in Table 1.

TABLE 1

| CODE | r/w Signals 115 Description |
|------|------------------------------|
| 00   | Memory Read by BPU           |
| 01   | Memory Write by BPU          |
| 10   | I/O Transfer, memory to I/O register |
| 11   | I/O Transfer, I/O register to memory |

If rw 115 indicates a memory to I/O register transfer and the IO Register Address matches the address of the I/O register of the block, the I/O block needs to load the I/O Register with the value on Data Bus 161b. If rw 115 indicates an I/O register to memory transfer and the IO Register Address matches the address of the I/O register, then the I/O block needs to drive Data Bus 161b with the values of the I/O Register.

PCM interface 140 recognizes its address on DMA Register Address bus 116 when it is the target of a DMA transfer and latches a PCM sample data word provided on data bus 161b into output register 141. Note that while in this embodiment DMA address bus 116 is only one bit, this could be different in other embodiments. After a PCM sample is received in output register 141, it is serialized and by serializer circuit 142 and output via signal PCMOUT to D/A circuit 530. PCM interface 140 is controlled by a system clock (SCLK) 820 which is used as a master clock signal in device 100. In the system illustrated in FIG. 5, a system clock is provided by host processor 550.

Figure 8:
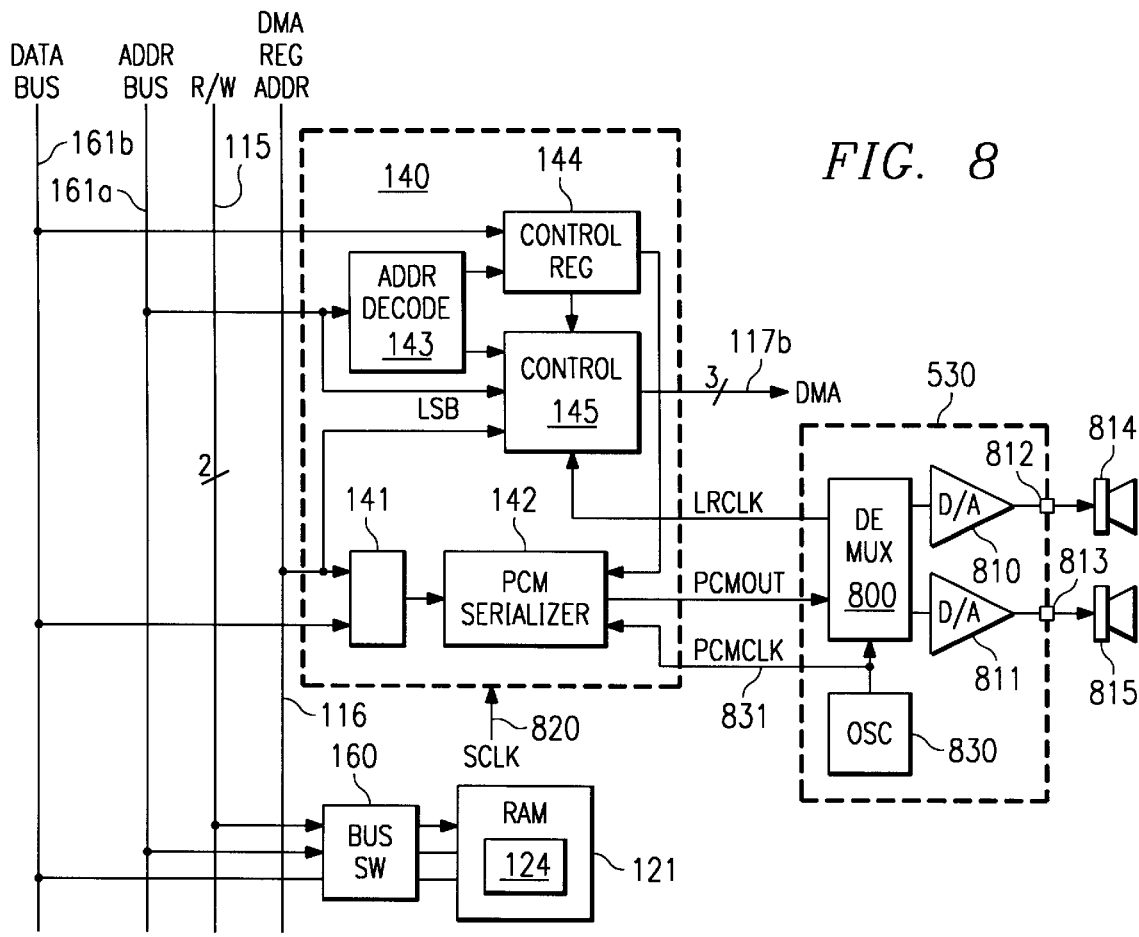
FIG. 8 is a block diagram illustrating the PCM interface of the device of FIG. 1 connected to an external digital to analog circuit.
Figure 9:
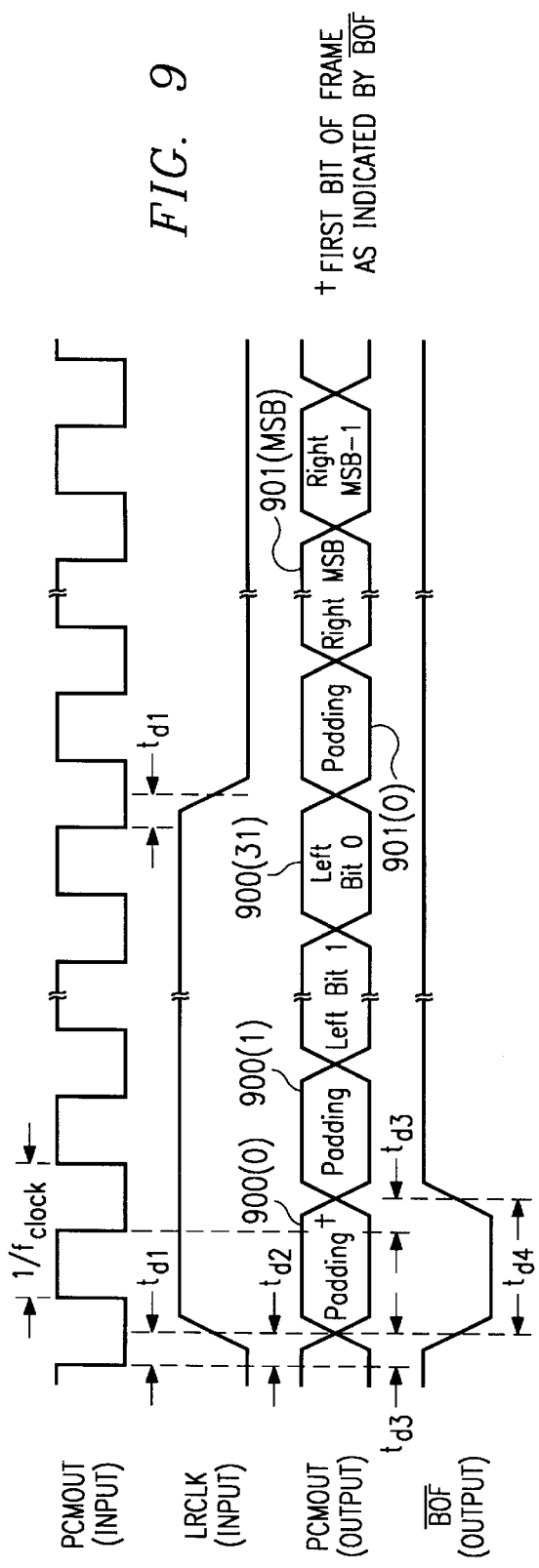
FIG. 9 is a timing diagram illustrating various signals associated with the PCM interface of FIG. 8, in accordance with EIAJ Format.
Figure 10:
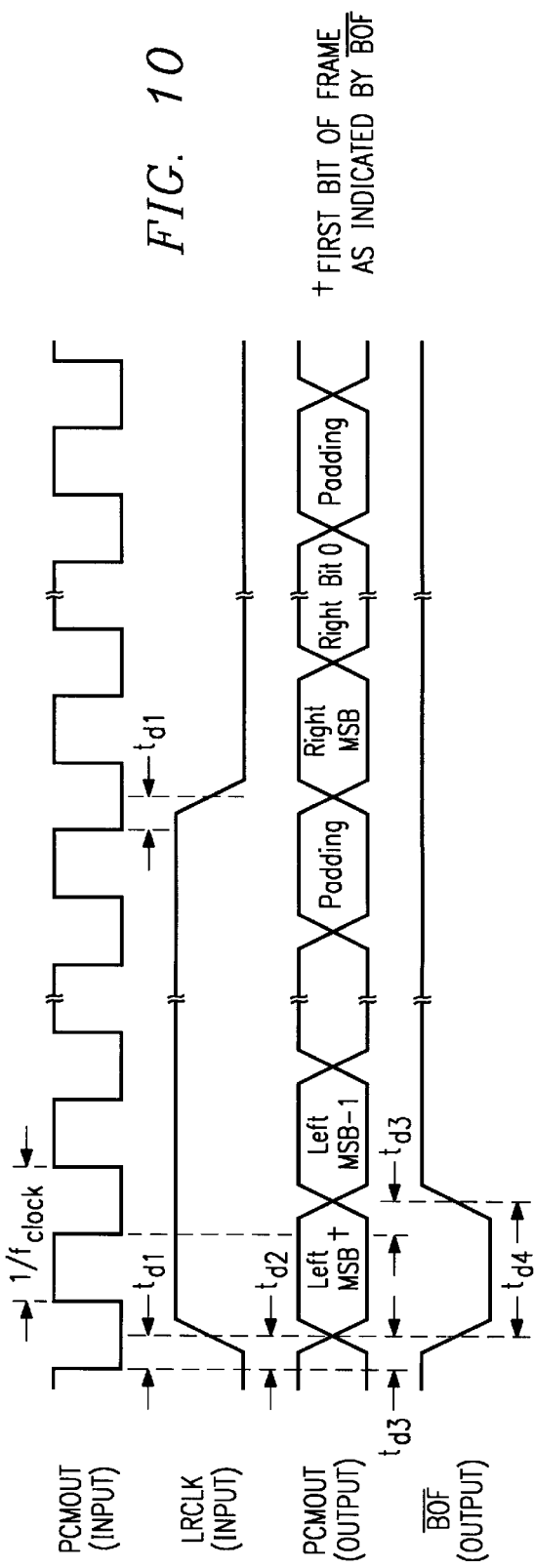
FIG. 10 is a timing diagram illustrating various signals associated with the PCM interface of FIG. 8, in accordance with I$^2$S Format.

FIG. 9 is a timing diagram illustrating various signals associated with the PCM interface of FIG. 8, in accordance with EIAJ Format and FIG. 10 is a timing diagram illustrating various signals associated with the PCM interface of FIG. 8, in accordance with $I^2S$ Format. In either case, a clock signal PCMCLK, which is generated by oscillator circuit 830, provided by D/A circuit 530 is used to clock out each bit 900(0–31) for a left PCM sample 900 and each bit of a right PCM sample 901.

Figure 11:
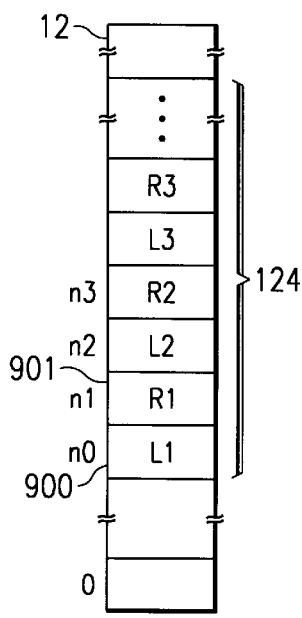
FIG. 11 illustrates PCM samples for a left and right channel stored in an output buffer.

FIG. 11 illustrates PCM samples for a left and right channel stored in output buffer 124. AU 120 synthesizes a frame of PCM samples for the left channel and stores each left sample L1, L2, etc. at an even address in buffer 124. AU 120 likewise synthesizes a frame of PCM sample for the right channel and stores each right sample R1, R2, etc. at an odd address in buffer 124. PCM samples are transferred to PCM interface 140 in this interleaved order so that PCM samples from both the left channel and the right channel can be output serially on the same signal line PCMOUT, as illustrated in FIGS. 9 and 10.

Referring again to FIG. 8, D/A circuit 530 receives signal PCMOUT into a de-multiplexor circuit 800 which separates left PCM samples from right PCM samples. Left PCM samples are sent to left D/A unit 810 which produces a left channel analog signal on terminal 812. A speaker subsystem 814 is connected to terminal 812 and reproduces the left channel analog signal as sound. Likewise, right PCM samples are sent to right D/A unit 811 which produces a right channel analog signal on terminal 813. A speaker subsystem 815 is connected to terminal 813 and reproduces the right channel analog signal as sound. Demux circuit 800 forms a signal LRCLK which is sent from D/A circuitry 530 to PCM interface 140 to indicate which channel sample D/A circuitry 530 expects to receive.

Figure 12:
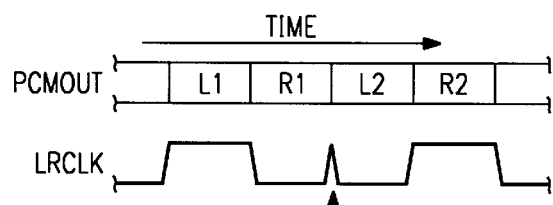
FIG. 12 is a timing diagram illustrating a timing problem which may occur in a typical PCM interface.

FIG. 12 is a timing diagram illustrating a timing problem which may occur in a prior art PCM interface, due to electrical noise, static discharge, clock anomalies, or other forms of interference. This occurs because D/A circuitry may be physically remote from an audio decoder and may operate on different clock signals. In FIG. 12, left channel PCM sample L1 is provided on signal PCMOUT while signal LRCLK is logically asserted, and right channel PCM sample R1 is provided on PCMOUT while LRCLK is logically deasserted. At time 910, some form of interference causes D/A circuit to expect a left channel sample, as indicated by signal LRCLK being deasserted. However, PCM interface 140 continues blindly sending PCM samples in interleaved order, so that left PCM sample L2 is output. This is an undesirable result which causes the left and right analog signals to be sent to the wrong speaker subsystems.

It has now been discovered that PCM interface 140 can determine which channel a given PCM sample is associated with by monitoring the address at which each PCM sample is stored in output buffer 124. As discussed above, left PCM samples are stored at even addresses and right PCM sample are stored at odd addresses. Referring again to FIG. 8, address decoder 143 monitors address bus 161*a* in order to determine when memory mapped control registers 144 are accessed. Address decoder 143 also monitors address bus 161*a* during DMA transfers. During a DMA transfer from output buffer 124 to PCM interface 140 as indicated by DMA address line 116 and R/W signals 115, control circuit 145 notes which address a PCM sample was read from, via decoder 143, and infers that sample's channel affiliation from that address. Control circuit 145 also monitors signal LRCLK to determine which channel D/A circuitry 530 expects. When control circuitry 145 determines that a channel discrepancy exists between a PCM sample that PCM interface is about to send and D/A circuitry expects to receive, an error correction procedure is invoked. Control circuit 145 forms an I/O request on request lines 117*b* and discards the pending PCM sample. The next sequential sample from buffer 124 is received by output register 141 and is output to D/A circuitry 530.

Figure 13:
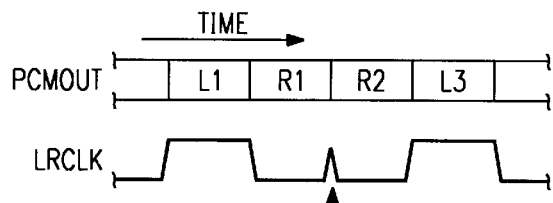
FIG. 13 is a timing diagram illustrating operation of the PCM interface of FIG. 8, according to an aspect of the present invention.

FIG. 13 illustrates the result of the error correction procedure discussed above. At time 911, control circuit 145 detects a channel discrepancy. Left PCM sample L2 was pending transmission to D/A circuit 530, but it is discarded and replaced by newly received right PCM sample R2. After this point, PCM samples are again transmitted to D/A circuitry 530 in interleaved order. Advantageously, left/right channel synchronization is maintained.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual devices which may be sold as bare die or packaged. After packaging, finished parts are biased into an operational state and tested for operational functionality.

Alternative embodiments can use other ranges of addresses for implying channel affiliation. For example, placing right channel samples at even output buffer addresses and left channel samples at odd addresses. More than two channels are managed by appropriate selection of address ranges. For example, three channels can be managed by locating each channel sample at every third address in the output buffer and using an algorithm to determine channel affiliation. Alternatively, addresses in the output buffer can be skipped to simplify the channel affiliation algorithm. Alternatively, one channel of PCM samples can be placed in a selected consecutive range of addresses in and other channels of PCM samples can be placed in other selected consecutive ranges of addresses. Any range can be used, as long as control circuitry 145 is aware of the address range allocation.

An alternative embodiment causes the same PCM sample to be resent to the D/A circuitry in order to re-establish channel synchronization.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

An advantage of the present invention is that a simple mechanism is provided that can correct channel synchronization errors based on the address from which a PCM sample is acquired.

Another advantage of the present invention is that it is applicable to systems which provide more than two channels of PCM output samples.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing device for processing a stream of data, comprising:

a memory circuit operable to hold a portion of the stream of data connected to an address bus;

processing circuitry connected to the memory circuit, the processing circuitry operable to derive the stream of data and to transfer the portion of the stream of data to the memory circuit such that a first portion of data is stored in a first range of addresses, and a second portion of data is stored in a second range of addresses;

a port for transferring the stream of data to an external device;

transfer circuitry operable to transfer the portion of the stream of data from the memory circuit to the transfer port in a sequential interleaved manner by placing a sequence of addresses on the address bus; and channel synchronization circuitry connected to the address bus, the channel synchronization circuitry operable to establish channel synchronization with the external device in response to the sequence of addresses.

2. The data processing device of claim 1, wherein the channel synchronization circuitry further comprises means for associating the first portion of data with a first channel in response to the first range of addresses, and for associating the second portion of data with a second channel in response to the second range of addresses.

3. The data processing device of claim 2, wherein the first range of addresses are even addresses and the second range of addresses are odd addresses.

4. The data processing device of claim 3, wherein the channel synchronization circuitry further comprises means for deleting a word of data after being transferred to the port in order to establish channel synchronization.

5. The data processing device of claim 3, wherein the channel synchronization circuitry further comprises means for re-transferring a word of data to the external device in order to establish channel synchronization.

6. The data processing device of claim 4, wherein the synchronization circuit has a channel input operable to receive a channel signal from the external device for use in determining channel synchronization.

7. The data processing device of claim 6, wherein the port has an output terminal for transferring the stream of data to the external device in a serial manner.

8. A method for processing a stream of data in a data processing device, wherein the data processing device is operable to transfer the stream of data to an external device, the method comprising:
    deriving the stream of data with processing circuitry within the processing device;
    storing at least a portion of the stream of data in memory circuitry within the processing device such that a first portion of data is stored in a first range of addresses and a second portion of data is stored in a second range of addresses;
    transferring the portion of the stream of data to a port connected to the external device in a sequential manner by placing a sequence of addresses on an address bus connected to the memory circuit;
    associating the portion of data transferred from the first range of addresses with a first channel and the portion of data transferred from the second range of addresses with a second channel; and
    transferring the stream of data to the external device from the port in a sequential interleaved manner and in a channel synchronized manner responsive to a channel signal received from the external device.

9. The method of claim 8, wherein the first range of addresses are even addresses and the second range of addresses are odd addresses.

10. The method of claim 9, further comprising deleting a word of data from the stream of data in order to establish the channel synchronism.

11. The method of claim 9, further comprising resending a word of data from the stream of data in order to establish the channel synchronism.

12. The method of claim 10, wherein the step of transferring the stream of data to the external device from the port further comprises transferring the stream of data to the external device in a serial manner from an output terminal of the data processing device.

13. An audio reproduction system, comprising:
    means for acquiring a stream of data which contains encoded audio data;
    a data device for processing the stream of data connected to the means for acquiring, the data device operable to form a plurality of channels of PCM data on an at least one device output terminal;
    digital to analog converter circuitry connected to the output terminal operable to convert the plurality of channels of PCM data to a plurality of analog audio signals on a respective plurality of D/A output terminals;
    a plurality of speaker subsystems connected respectively to the plurality of D/A output terminals;
    wherein the data device further comprises:
        a memory circuit operable to hold a portion of the stream of data connected to an address bus;
        processing circuitry connected to the memory circuit, the processing circuitry operable to derive the stream of data and to transfer the portion of the stream of data to the memory circuit such that a first portion of data is stored in a first range of addresses, and a second portion of data is stored in a second range of addresses;
        a port for transferring the stream of data to an external device;
        transfer circuitry operable to transfer the portion of the stream of data from the memory circuit to the transfer port in a sequential manner by placing a sequence of addresses on the address bus; and
        channel synchronization circuitry connected to the address bus, the channel synchronization circuitry operable to establish channel synchronization with the digital to analog circuitry in response to the sequence of addresses.

14. The audio reproduction system of claim 13, wherein the means for acquiring comprises a satellite broadcast receiver.

15. The audio reproduction system of claim 13, wherein the means for acquiring comprises a digital disk player.

16. The audio reproduction system of claim 13, wherein the means for acquiring comprises a cable TV receiver.

17. A data processing device for processing a stream of data, comprising:
    a memory circuit operable to hold a portion of the stream of data connected to an address bus;
    processing circuitry connected to the memory circuit, the processing circuitry operable to derive the stream of data and to transfer the portion of the stream of data to the memory circuit such that a first portion of data associated with a first channel is stored in a first range of addresses, and a second portion of data associated with a second channel is stored in a second range of addresses;
    interface circuitry for transferring the first portion of data and the second portion of data to an external device in a sequential interleaved manner;
    transfer circuitry operable to transfer the first portion of the stream of data and the second portion of the stream of data from the memory circuit to the interface circuitry in a sequential interleaved manner from the first range of addresses and from the second range of addresses by placing a sequence of addresses on the address bus; and
    channel synchronization circuitry associated with the interface circuitry, the channel synchronization circuitry operable to establish channel synchronization with the external device in response to the sequence of addresses and to a synchronization signal from the external device, wherein the channel synchronization circuitry comprises:
        decoding circuitry connected to the address bus for associating the first portion of data with the first channel in response to the first range of addresses, and for associating the second portion of data with the second channel in response to the second range of addresses;

a synchronization input operable to receive the synchronization signal from the external device, the synchronization signal operable to alternately request data for the first channel and data for the second channel; and control circuitry for determining an out of synchronization condition and restoring channel synchronization connected to the decoding circuitry and to the synchronization input, the control circuitry operable to interrupt the interface circuitry when an out of synchronization condition is determined and to reorder a data transfer to the external device so that synchronization is restored.

18. The data processing device of claim 17, wherein the channel synchronization circuitry further comprises circuitry for deleting a word of data after being transferred to the interface circuitry in order to restore channel synchronization.

19. The data processing device of claim 17, wherein the channel synchronization circuitry further comprises circuitry for re-transferring a word of data to the external device in order to restore channel synchronization.

* * * * *